(12) United States Patent
Moreau et al.

(10) Patent No.: US 7,758,910 B2
(45) Date of Patent: Jul. 20, 2010

(54) METHOD OF ON-LINE THICKNESS MEASUREMENT OF APPLIED COATINGS

(75) Inventors: Christian Moreau, Boucherville (CA); Mario Lamontagne, Varennes (CA); Francois Nadeau, St-Bruno (CA); Jacques Blain, Varennes (CA); Luc Pouliot, St-Bruno (CA); Alexandre Nadeau, Montreal (CA); Simon Alex Berube, Greenfield Park (CA)

(73) Assignee: National Research Council of Canada, Ottawa, ON (CA)

( * ) Notice: Subject to any disclaimer, the term of this patent is extended or adjusted under 35 U.S.C. 154(b) by 1064 days.

(21) Appl. No.: 11/380,696

(22) Filed: Apr. 28, 2006

(65) Prior Publication Data

US 2006/0246213 A1    Nov. 2, 2006

Related U.S. Application Data

(60) Provisional application No. 60/675,919, filed on Apr. 29, 2005.

(51) Int. Cl.
*B05D 1/02* (2006.01)
*B29C 41/52* (2006.01)
*B05C 11/00* (2006.01)

(52) U.S. Cl. .......................... 427/9; 118/300; 118/325; 118/668; 118/712; 118/713; 264/129; 264/131; 264/40.1; 264/484; 264/409; 427/8; 427/180; 427/425; 427/427.2; 427/427.3; 427/471; 427/480; 427/481

(58) Field of Classification Search ...................... 427/9
See application file for complete search history.

(56) References Cited

U.S. PATENT DOCUMENTS

| | | | | |
|---|---|---|---|---|
| 5,038,615 A | * | 8/1991 | Trulson et al. | 73/597 |
| 6,040,910 A | * | 3/2000 | Wu et al. | 356/613 |
| 2001/0002284 A1 | * | 5/2001 | Kohler et al. | 427/488 |
| 2004/0005403 A1 | * | 1/2004 | Nesbitt | 427/8 |

OTHER PUBLICATIONS

Optical Techniques For Industrial Inspection—P. Cielo—National Research Council of Canada—Academic Press, San Diego 1988—pp. 47-53, pp. 257-400, pp. 387-389.*

* cited by examiner

*Primary Examiner*—Michael Kornakov
*Assistant Examiner*—Alexander Weddle
(74) *Attorney, Agent, or Firm*—Marks & Clerk; Richard J. Mitchell (57) ABSTRACT

In a method of measuring the thickness of a coating as it is applied to a substrate, wherein the coating is applied as a thin ribbon from a spray gun, at least one surface profile of the applied coating is obtained along a line intersecting the ribbon during relative movement of the substrate and spray gun. The thickness of the applied coating is computed from the obtained surface profile.

13 Claims, 5 Drawing Sheets

METHOD OF ON-LINE THICKNESS MEASUREMENT OF APPLIED COATINGS

CROSS REFERENCE TO RELATED APPLICATION

This application claims the benefit under 35 USC 119(e) of prior U.S. provisional application No. 60/675,919, filed Apr. 29, 2005, the contents of which are herein incorporated by reference.

FIELD OF THE INVENTION

This invention relates to the application of coatings onto a substrate, and more particularly to a method of on-line measurement of coatings applied in the form of a ribbon on a substrate, and in particular to thermally applied coatings.

BACKGROUND OF THE INVENTION

Thermally sprayed coatings are used in many industrial applications in various sectors: aerospace, automobile, energy, biomedical, pulp and paper, etc. The role of the deposited coatings is generally to protect a part from corrosion, erosion, abrasion or high temperature. Coatings can also be used to promote the biocompatibility of the part, to create a functional surface or to build new parts or repair worn ones. In these applications, for various reasons it is desirable to determine the thickness of the applied coatings.

Thermal spray processes are difficult to control on the production floor. Many factors drift from their optimum value, and small deviations in conditions may result in considerable variation in the deposition. For example, the properties of a feed of powders (or other deposition materials) in a hot gas jet (plasma or flame) are crucial as they influence directly the trajectories of the powers in the gas jet, influencing the powder temperature and velocity and thus the coating structure, and deposition efficiency. Also, in DC plasma spray processes, the wear of the electrode with time due to the high intensity current (300-1000 A) in the torch affects the plasma properties, and consequently also the powder conditions and the coating structure and deposition efficiency.

Variations in deposition efficiency lead to variation in the resulting coating thickness deposited in a certain period of time. This is a major concern in the industry. Today, control of the final coating thickness is often done by measuring it directly by comparing the thickness of the coated part with its thickness before deposition. The measurements are carried out using mechanical gauges such as micrometers, vernier calipers, etc. Other methods such as eddy current or magnetic induction are also used when the magnetic properties of the coating and/or substrate materials make this possible. These approaches are time consuming as they require the part to be cooled down to room temperature before the measurement is carried out manually by the operator. If the coating thickness is below the target thickness, the part has to be returned in the spray room, reheated and coated again to reach the desired thickness. If the coating is too thick, the coating has to be stripped and the coating must be sprayed again.

As the control of the coating thickness is currently done after spraying due to the limitations of the measurement techniques, there is a tremendous need for a measurement technique that can be used on-line during spraying. If such a technique were available, the operator would have the possibility to stop the process when the coating thickness is within the desired thickness window for the application.

Moreover, in some industrial applications, very large parts must be coated requiring many days of spraying. During this period of time the deposition efficiency may drift due to reasons like those mentioned above. For example, the deposition efficiency may drift by up to 20% in plasma spray processes over the time required to coat a surface. In such cases, the time to deposit the desired thickness and the quantity of powder used increases by 20% negatively affecting the productivity of the process.

The techniques mentioned above (mechanical gauges, eddy current or magnetic gauges) that are currently used in the industry can not be used during spraying as the part is hot, located in an hostile spray environment and generally in movement. Furthermore testing based on electromagnetic properties is not suitable for all deposition materials, and would require expensive equipment to reliably serve in such an environment.

There are other techniques that can be used to measure the coating thickness of sprayed coatings that have cooled. Many approaches use ultrasonic techniques in various configurations. For example, Carslon et al. (U.S. Pat. No. 6,363,787) take advantage of the surface waves to measure the thickness of metallic coatings. Laser-ultrasonic techniques can be used also as they don't require a direct contact with the coated parts. However, the cost for implementing such a technique in production limits strongly its market. Furthermore, these ultrasonic techniques generally require an a priori knowledge of the elastic properties of the coatings in order to evaluate their thickness. Unfortunately these properties are generally not known for thermal spray coatings and they depend strongly on the spray parameters, temperature of the substrate, etc.

Nuclear radioactive techniques can be used also to monitor the thickness of coatings as taught by P. Cielo, in Optical Techniques for Industrial Inspection, Academic Press, Inc., San Diego, 1988, pp. 47-53. One of the main advantages of these techniques is that they are non contact techniques. However, they require adequate safety shielding to protect human bodies from the harmful radiation. An example of this technique for measuring the thickness of paint deposited on a metal substrate is described by MacKenzie (U.S. Pat. No. 6,252,930). X-ray tomography can also be employed to measure the coating thickness but it is difficult to accomplish during spraying as the sensing equipment is quite large. Moreover, the cost for such equipment limits considerably the use of this approach.

Optical techniques can be used to measure the coating thickness. Measurements can be carried out by a variety of techniques such as optical triangulation, interferential techniques or others. These techniques make it possible to determine the surface profile of the parts without contact. The coating thickness is obtained by measuring the dimensions of the part before coating deposition and during or after deposition. The coating thicknesses have been obtained from the difference between the two measurements. This approach has only been used on relatively thin parts. On large parts, the change in the dimensions of the parts due to the thermal expansion is not negligible as compared to the coating thickness. Typically the temperature of the part changes from room temperature to 100-300° C. during spraying. The resulting change in the part dimensions due to thermal expansion may reach a few millimeters, which is one order of magnitude larger that the typical thickness of thermal spray coatings. Other surface profilometry techniques (with or without contact) have also limited applicability for thermal spray coatings as they suffer the same limitations as the optical profiling techniques.

Coating thicknesses can be measured also by thermal-wave methods (see Cielo, pp. 387-389). Using these techniques, the surface of the coating is heated by a laser or another source of heat, and the evolution of the coating surface temperature is monitored. The coating thickness is deduced from the time evolution of the surface temperature knowing the thermal properties of the coating and substrate materials. Bantel et al. (U.S. Pat. No. 4,818,118) describe such a technique applied to the monitoring of the thickness of thermal barrier coatings.

In typical thermal spray conditions used in industry, the coating thickness per pass ranges typically from 10 to 25 microns (may reach 50 microns in some cases). As the coating is formed by the solidification of 10-100 micron diameter particles, its surface is relatively rough. The mean roughness value (Ra) is about 5 to 10 microns having peaks and valleys up to 20-40 micron magnitude. In such conditions, measuring the surface profile with a precision sufficient to extract the value of the coating step formed during a single pass is quite a challenge. The roughness of the coating is larger than the typical thickness deposited per pass. Moreover the substrate is, in general, not perfectly formed, making the measurement of the step (a few microns height on meter-long parts) very difficult or even impossible in certain cases. Moreover, the spraying environment on the production floor is not adapted to sophisticated detection instruments for determining the coating surface profile. There are vibrations due to the rotation of the part, movement of the torch and high throughput ventilation. The environment may be dusty because of the powders fed in the process and the fumes generated when the powders are exposed to the high temperature flame.

What is needed therefore is a method of measuring deposition thickness in real time under typical thermal spray conditions used in the industry.

SUMMARY OF THE INVENTION

This invention provides a method of measuring the coating thickness during deposition in a thermal spray process. The measurement is based on a surface step produced during spraying on a substrate at a predefined position. The measurement position is preferably on a surface having a large radius of curvature (either convex or concave). The radius of curvature extends in at least one direction that is substantially perpendicular to the direction of relative movement of the spray torch with respect to the substrate.

According to the present invention there is provided a method of measuring the thickness of a coating as it is applied to a substrate, wherein the coating is applied as a thin ribbon from a spray gun, comprising obtaining at least one surface profile of the applied coating along a line intersecting said ribbon during relative movement of the substrate and spray gun; and computing the thickness of the applied coating from said at least one obtained surface profile.

In one embodiment of the present invention, a profilometer is used to determine the surface profile of the part to be coated as the spray torch moves relative to the part. It will be appreciated of course that it makes no difference to the principle of operation of the invention whether the spray gun moves over the substrate, or the substrate moves under the spray gun. Reference to the spray gun moving over the substrate is intended to include movement of the substrate under the spray gun, that is either the spray gun, or the substrate or both, can be movable. The change with time of the surface profile associated with the deposition of new coating material in the detection range of the profilometer is used to determine the coating thickness as the torch movement crosses the profilometer detection range. The change in thickness may be computed after each pass of a thermal spray by computing a surface area of a difference in smoothed profiles.

Since the thickness of the typical coating applied is only about 10 to 25 microns, it is very surprising that satisfactory measurements can be obtained from profile measurements. There is a considerable amount of noise present in the profile signal due to vibrations of the parts. It has been found that most of the noise can be cancelled out by a differential technique, whereby profiles are taken at successive times as the spray gun moves over the substrate, and the thickness of the coating applied during the pass is computed from the difference between the two profiles.

In a second embodiment of this invention, the profilometer is stationary relative to the spray torch and the profilometer is adapted to monitor continuously (or at any desired interval) the surface profile of the part to be coated. A difference in height between the profiles observed before and after the torch passage may be used to determine the coating thickness deposited during the current pass.

Suitable known algorithms for computing the profile known in the art of profilometry may be used, and surprisingly have been found to compensate for fluctuations in the surfaces of both the substrate and the coating, while reliably producing a measure of the thickness of the coating step.

In another aspect the invention provides an apparatus for measuring the thickness of a coating as it is applied to a substrate, wherein the coating is applied as a thin ribbon from a spray gun, comprising a profilometer for obtaining at least one surface profile of the applied coating along a line intersecting said ribbon during relative movement of the substrate and spray gun; and a computer programmed to compute the thickness of the applied coating from said at least one obtained surface profile extending over a step formed by said ribbon as it moves along the substrate.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
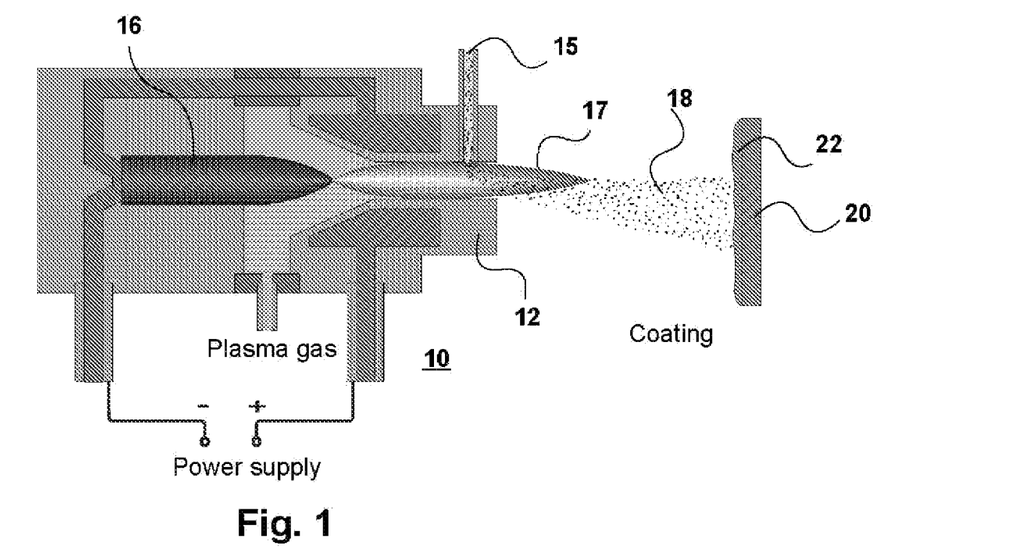
FIG. 1 is a schematic view of a plasma torch applying a coating to a substrate.

FIG. 1 schematically illustrates a conventional DC plasma torch 10. Numerous alternatives known in the art can be used equally well, including high velocity oxy fuel (HVOF) spray apparatus, a flame spray apparatus, a water stabilized plasma spray apparatus (WSP), a radio frequency inductively coupled plasma spray apparatus (RF-ICP), an arc-spray process, a (VPS) vacuum plasma spray process, or a cold spray process. The spray torch 10 includes an anode 12, a powder feeder port 15, and a cathode 16. The spray torch 12 projects a spray 18 with the aid of plasma 17 onto the substrate 20 to form coating 22.

In a conventional plasma torch spraying process, like in other thermal spray processes, the material to be deposited impacts on the substrate in the form of molten or partially molten particles. These particles flatten and solidify upon collision with the substrate. The spot on which the particles impact typically covers a region of about 1 to 5 cm in diameter. The particles may be supplied in any known manner suitable to the DC plasma torch or its alternative; however in the embodiment illustrated in FIG. 1 a powder feed is used, and the deposition material is supplied in powdered form. Herein the term powder includes any deposition material carried in any convenient manner, and a DC plasma torch is merely one example of a thermal spray system for delivering heated deposition material to the substrate. To form a coating of uniform thickness, the torch is normally moved with respect to the substrate preserving an angle and distance from the torch to the substrate, so that a desired surface of the substrate (coated part) is coated with the particles.

As the spray torch 10 passes across the substrate along a predefined curve (a straight line will be presumed for purposes of description), a ribbon or cordon of material is deposited. Each ribbon, if deposited on an otherwise planar surface would have a bell-shaped profile. As the ribbons are deposited one on top of the other with partial overlap a coating is produced, and the coating has an edge having a corresponding lateral profile. The torch spray may be moved relative to the part along a straight line, and then moved perpendicular to the straight line by a few millimeters and moved along a parallel line. By choosing a separation of the parallel lines, each pass of the torch spray deposits a ribbon, in a region that overlaps of the coating formed to present.

Figure 2:
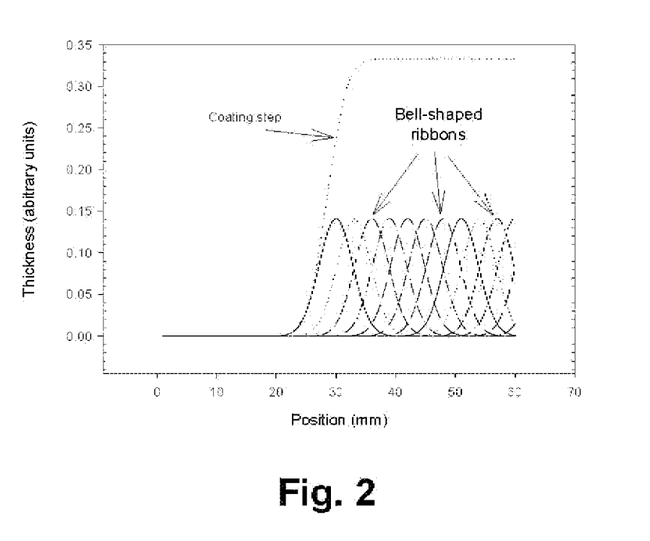
FIG. 2 is a plot showing the formation of the step in the coating profile as a result of the cumulative effect of bell-shaped ribbons.

FIG. 2 shows a schematic view of the profile of an edge of the coating surface, and shows a decomposition of the coating into regular ribbons. For the purposes of illustration, each ribbon is shown as if it were deposited directly on the substrate (y-axis) to emphasize the profile of the ribbon, although it will be appreciated by those skilled in the art that in fact the ribbons are applied one on top of the other to produce the coating. A few ribbons were deposited on the right side of the part. The addition of the bell-shaped profiles forms a step with a width (i.e. a transition from the substrate to a top of the coating) of about 10 mm in this example.

It will be appreciated that while the deposited coating is schematically illustrated as planar and parallel to that of the substrate, the aforementioned roughness of the deposited coating and unevenness of the substrate are significant impediments to measuring the height of the coating step.

When a coating is sprayed on an axis-symmetrical part, such as a cylinder, the part can be put in rotation along its axis and the torch moves along a trajectory parallel to the part axis. The rotational speed (RPM) of the part and the transverse speed of the torch are adjusted in such a way that successively deposited ribbons overlap by a few millimeters, as illustrated in FIG. 2.

The present invention is exemplified by two methods for determining the coating thickness deposited per pass by tracking the coating step during spraying, and measuring its height. As described below, different configurations can be used to achieve this measurement according to the geometry of the parts to be coated. The methods can only be used in thermal spray or other deposition processes in which the coating material is substantially deposited on a limited spray region forming a step in the coating thickness during deposition.

In the method described in this invention, the coating surface profile is measured by a profilometer based on the techniques mentioned above or any other technique that can determine the profile with a sufficient precision, including contact and contact-less techniques. Moiré or interferential profiling techniques as described in (e.g. see Chapters 5 and 6, pp. 257-400 of the Cielo and D. Post, B. Han and P. Ifju in "High Sensitivity Moiré: Experimental Analysis for Mechanics and Materials, Springer-Verlag, New-York, 1994) can be used as well. What is required of the profilometric system is a mathematical representation of a profile relative to a profile of the substrate (known or empirically derived) that intersects the coating step and extends in a direction that is preferably orthogonal to the edge of the coating step, and wherein the extension beyond the coating step is sufficient to enable characterization of the heights of a top of the deposited coating, and the substrate surface or the previously deposited layer surface despite imperfections in both the surfaces.

In the examples provided below, a non-contact optical triangulation profilometer is used for practical reasons. Such a sensor is easy to implement in industrial spray facilities, and is robust and inexpensive relative to some other profilometry techniques.

Figure 3:
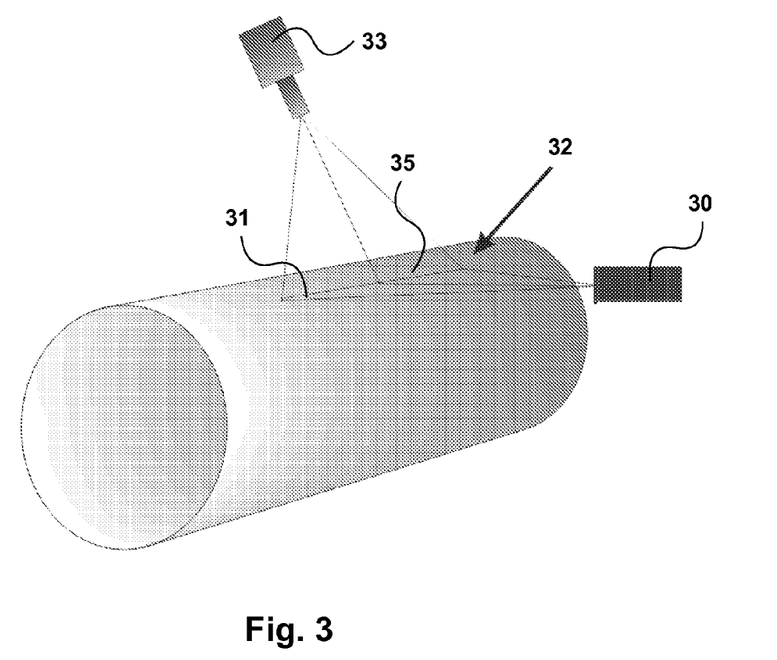
FIG. 3 is a schematic view of an optical triangulation profilometer.

FIG. 3 shows a schematic view of an optical triangulation profilometer. A laser diode 30 is used to project a narrow beam of light 31 on the surface of the substrate 32, which in this case is a rotating cylinder, to form a projected line 35. A camera 33 is pointed at the coating surface at an oblique angle to record the profile of the projected light line. In the configuration used in the following examples, the length was about 8-cm long. An anamorphic lens is used in front of the camera to get a larger optical magnification in a direction perpendicular to the projected light line than parallel to it. This makes it possible to improve the height resolution of the profilometer while the length of the profile is relatively long (8 cm).

Figure 4:
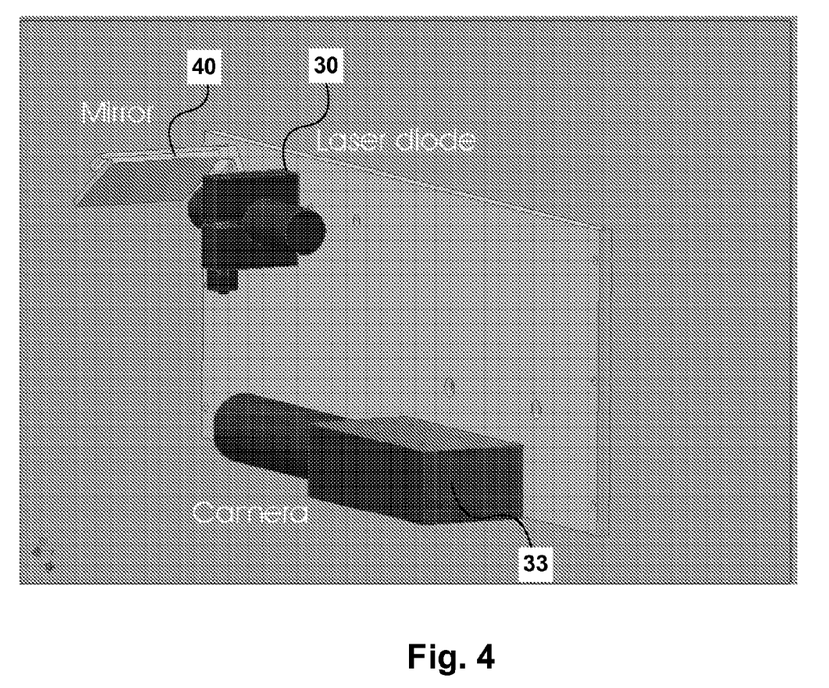
FIG. 4 illustrates a compact arrangement for the optical triangulation profilometer.

The components of the optical profilometer can be mounted in a compact arrangement adapted for industrial use, as illustrated for example in FIG. 4. The mirror 40 is used to project the laser line at an angle relative to the camera optical axis and substrate surface. Naturally only the laser line in a field of view of the camera is detected, and arrangement of optical devices required to ensure this are provided in known ways. The coating surface profile is obtained by measuring the height of the line at a specific position, and calculating (by triangulation) the height of the corresponding point on the part surface knowing the angle between the laser projection direction and the camera axis.

The wavelength of the emitted light of the laser diode may be in the visible or near-infrared range that can be readily detected by the camera. The projected line is as narrow as possible and of a well-known shape (a straight line is normally preferred). The line is long enough to illuminate the coating step region and regions before and after the coating step. In the embodiments described below the line length is around 8 cm. A rule of thumb used to decide on this length is 3-4 times the extent of the spray.

A series of parallel lines of light can also be used to facilitate the alignment of the profilometer as at least one line will be fully included in the field of view of the camera. Many profiles can be simultaneously acquired if many lines are simultaneously visible in the field of view of the camera, making the measurements more precise. Other patterns of light (points, lines, arcs, etc.) can be projected instead of the line illustrated to obtain the surface profile using this embodiment of the invention.

The profilometer is preferably located close to the substrate surface in such a way that the radiation, particles and hot gases exiting the spray torch do not influence the measurements or damage the profilometer.

Figures 5, 6A:
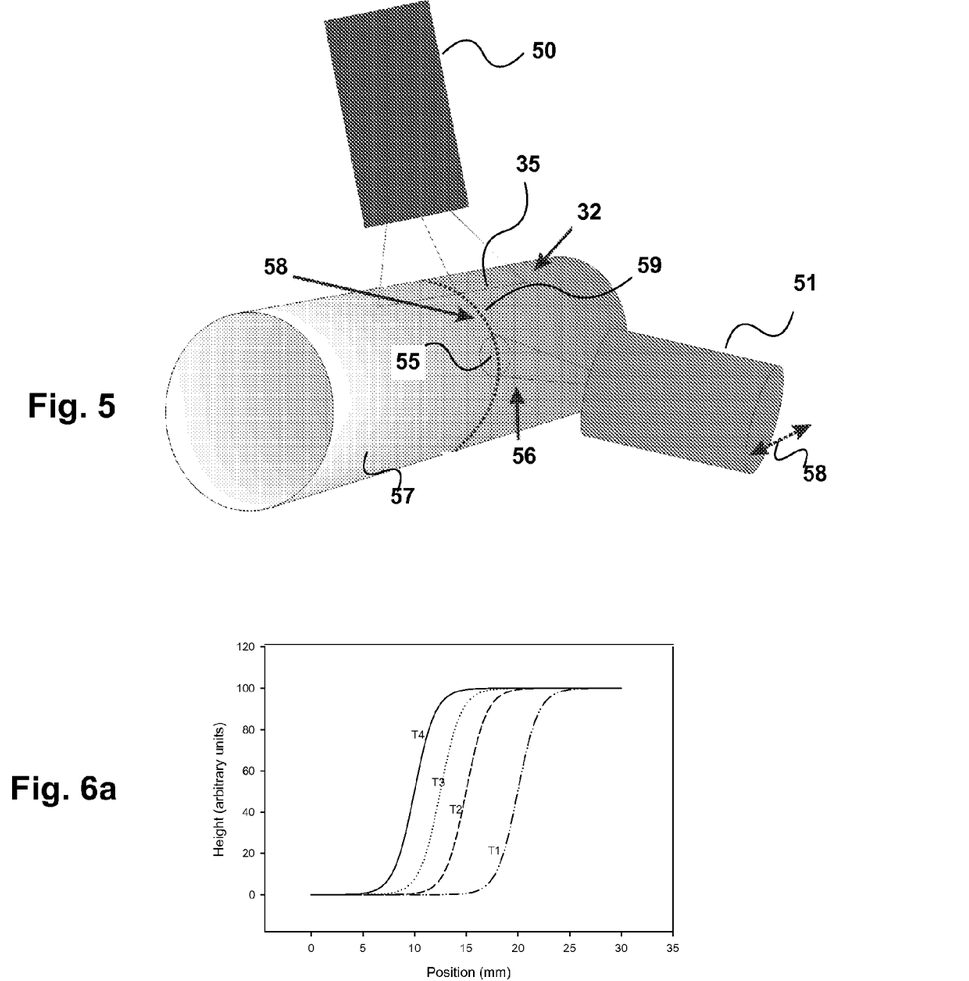
FIG. 5 shows an embodiment of the invention with a stationary profilometer.
FIG. 6a shows plots of the coating step at different times and FIG. 6b, the difference between coating step profiles recorded at different times.

In a first embodiment, the coating is sprayed on a rotating cylinder, the profilometer is stationary relative to the cylinder axis and the torch is scanned along a trajectory parallel to the cylinder axis. FIG. 5 schematically illustrates a view of this arrangement. Here the spray torch 51 projects a jet 56, which terminates in a spot 55 on the surface of the rotating cylinder 57. As the cylinder 57 rotates and the spray torch 51 moves in the axial direction 58, the ribbon 59 is deposited as a spiral band on the surface of the cylinder, and the leading edge of this defines the step that is detected using the profilometer 50, which obtains a surface profile across the step.

The surface profile of the coating is recorded at specific time intervals while the coating steps progress laterally as the torch is moving. The actual profile of the coating surface is extracted from the images recorded by the camera. To do so, the transverse intensity profile of the line (e.g a grayscale image) is determined in each pixel column of the image, and a centroid of the line is calculated. A graph of the actual line profile along the profilometer field of view is thus obtained by plotting the height of the centroid as a function of position. After recording, the consecutive profiles are subtracted from each other. The area A below the obtained differential profiles is proportional to the coating thickness h and the displacement d of the coating step (or the torch) during the time interval between the acquisition of the two profiles. The coating thickness is then calculated using the following equation:

$$h = A/d \quad \text{(Eq. 1)}$$

The distance d can be obtained from an a priori knowledge of the torch lateral speed or by measuring the torch speed using another detection approach or from the time evolution of the profiles of the coating step. Indeed, the step is generally large enough to be detected in each individual profile making it possible to determine the step lateral speed, which is equal to the torch speed.

Figure 6B:
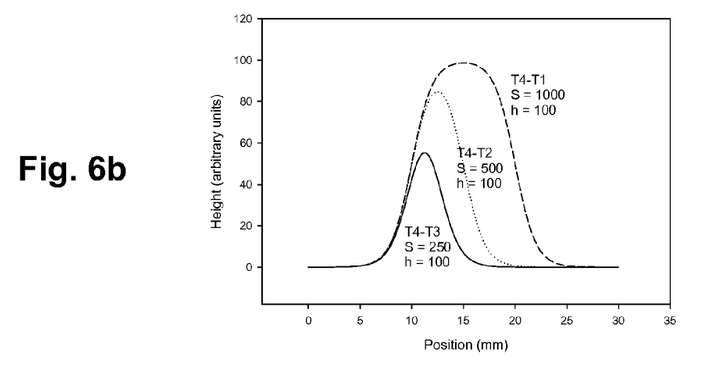

Examples of simulated profiles recorded at different times are illustrated in FIGS. 6a and 6b. In this case, four profiles were obtained at four different times. The bottom graph in FIG. 6b shows the corresponding differential profiles and the calculated value of their surface as well as the corresponding coating thickness calculated from equation 1. This calculation is performed as the torch moves along the profilometer detection range and the deposited coating thickness during the current pass is calculated. In this configuration the actual coating thickness is measured each time the torch passes in the profilometer detection range. The total coating thickness is obtained by adding the thicknesses of the consecutive passes of the torch. If the distance d between the two profiles is larger than the width of the coating step, the coating thickness can alternatively be obtained from the height of the differential profile as shown FIG. 6 for the differential profile T4-T1. However it has been found that the more robust method involves computing the area of the differential profile, and calculating the height according to equation 1.

Figure 7A:
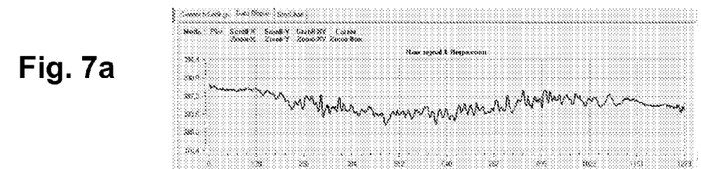
FIG. 7a is a trace showing the raw camera signal produced by a single pass across a coating step.
Figure 7B:
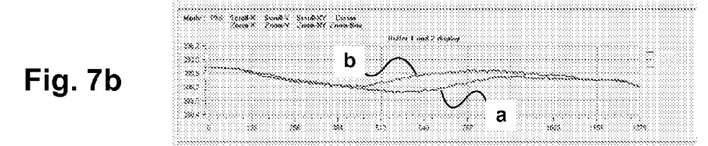
FIG. 7b is a trace showing the curves produced after signal processing with a time delay of about 15 seconds between the signals.

FIG. 7a shows the raw signal obtained from the CCD camera at an instant in time. This is a noisy signal due to the movement of the surface and various other sources of noise. After acquiring multiple profiles and signal processing, this produces the lower curve a in the FIG. 7b. This curve shows a gradual, but discernible rise, where the coating step occurs. Curve b corresponds to curve a, but taken with a delay of 15 seconds when the spray gun has advanced along the substrate. The coating step can be seen to have shifted toward the left.

Figure 7C:
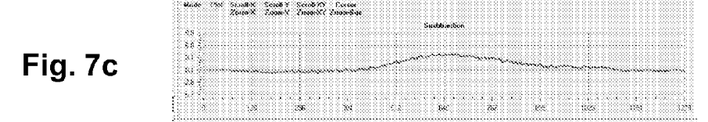
FIG. 7c shows the result of subtracting the curves of FIG. 7b from each other.

FIG. 7c represents the difference between the two curves a and b. The area under this curve, between the point of maximum height and a baseline extending between the lowest points enables the height of the coating step to be computed as described above.

The differential area computation of the coating thickness is independent of the precise knowledge of shape of the substrate, straightness of the projected laser line, quality of the optics, etc. as consecutive profiles are subtracted from each other as long as 1) the position on the surface is aligned for each measurement, or 2) the image is a time average of enough of the cylindrical surface to serve to adequately represent the surface. Adequate representation can be provided by adjusting the exposure time of the camera, and/or summing the sequential images produced within a preferred period of time so that the successive profiles are representative of the surface of the cylinder. Either way it is ensured that the difference between consecutive profiles collected at two different times is due to the amount of material deposited between this time interval.

The coating thickness is measured only when the torch (of the coating step) moves in front of the profilometer field of view. For large parts, many profilometers located at different positions along the cylinder axis can be used providing thickness measurements at each band illuminated by respective profilometers. This can be achieved also by moving the same profilometer to different locations during the torch passage, or by optical path switching of the laser line and the field of view of the camera.

In order to eliminate the noise due to natural roughness of the coatings and the vibrations of the substrate and/or profilometer, it may be necessary to filter the collected signals. This can be achieved by the combination of known signal processing means, and suitable optical magnification of the dimension of the probed region in combination with selection of an appropriate width of the projected laser line in the current example, although now that it is known that this can be done, other means known in the art can achieve this result.

Figure 8:
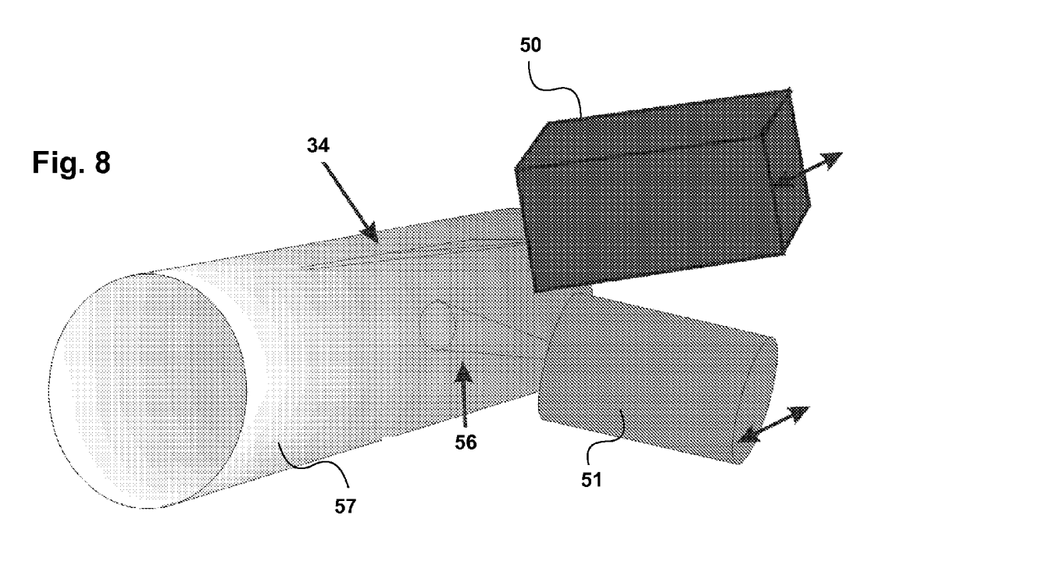
FIG. 8 shows an embodiment of the invention using a profilometer moving with the torch.

In accordance with a second embodiment shown in FIG. 8, the coating is sprayed on rotating cylinder 32 and the profilometer 50 moves with the spray torch 51 along a trajectory parallel to the cylinder axis.

In this arrangement, the profilometer 50 is stationary relative to the torch 51 while both the torch and profilometer move relative to the substrate. The profile of the coating surface is continuously monitored. The profilometer is aligned in such a way that the coating step is located near the center of the projected light line. As noted above, of course the rotating cylinder could equally well be moved under the combination of the profilometer and the spray torch.

Figure 9:
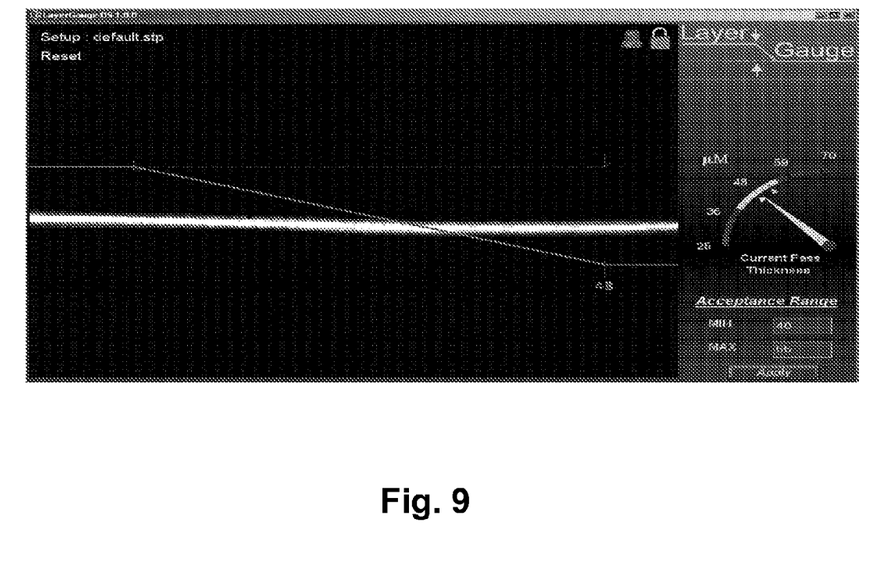
FIG. 9 shows an actual profile of a coating step recorded on an HVOF sprayed coating.

Surprisingly, it is possible to measure the height of the coating step in this configuration without having to move the profilometer relative to the torch. To do so, one must rely on robust and efficient smoothing and filtering techniques to extract the step height from the surface profile. Clearly the smoothing algorithms take advantage of the relatively well-known lateral extension of the coating step in thermal spray processes to filter lower and higher spatial frequencies on the collected surface profiles. FIG. 9 shows an example of an actual surface coating profile.

It will be appreciated that many different methods for computing the thickness can be used. The following is an exemplary method demonstrating the viability of the profilometric method.

The actual profile of the coating surface is extracted from the images recorded by the camera at a pre-established rate, which may be the conventional rate for video cameras. To do so, the transverse intensity profile of the line is determined in each column of the image and its centroid is calculated. A graph of the actual line profile along the profilometer field of view is thus obtained by plotting the height of the centroid as a function of position. Many profiles are acquired, treated as described above, and added together and then filtered to remove the high-frequency noise (typically caused by roughness of the surfaces) and low-frequency noise (typically caused by gradual curvature of the substrate surface) to obtain a precise sub-pixel mathematical representation of the coating surface profile called P1. A second profile called P2 is obtained by numerically translating the profile P1 along the line axis direction by a known distance, simulating the temporal offset of the camera that was used to find the differential profile in accordance with the previous embodiment. Then, a differential profile is obtained by subtracting profiles P1 and P2. As described in the first embodiment of the invention, the area A below the obtained differential profile is proportional to the coating thickness h and the translation distance d used in the previous step. The coating thickness is then calculated using Equation 1.

Figure 10:
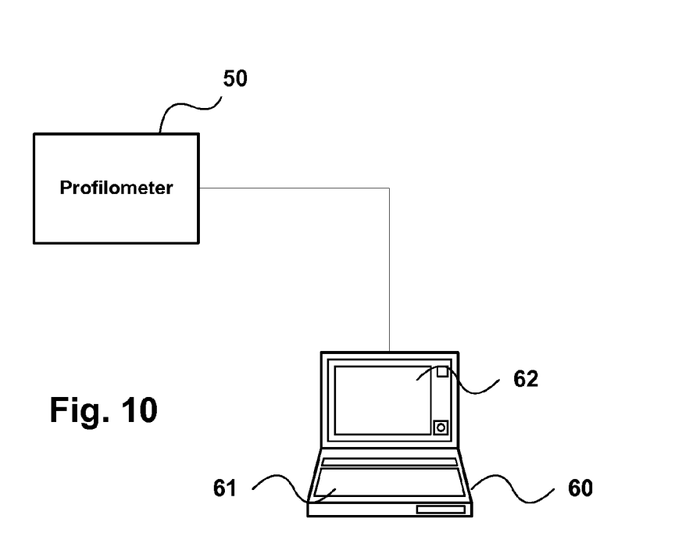
FIG. 10 is a block diagram of an apparatus for computing the coating thickness.

FIG. 10 shows an apparatus for computing the coating thickness. The output of the profilometer is fed to a computer 60 with keyboard 61 and display 62. The computer is programmed to compute the thickness of the applied coating from the obtained profile in the manner described above.

With this configuration, it is possible to measure coating steps as small as 5 microns.

This approach, in comparison with the one described in the first embodiment, makes it possible to continuously monitor the deposited coating thickness during spraying. However, it is more sensitive to any curvature of part surface and to vibrations associated with the movement of the profilometer.

The invention claimed is:

1. A method of measuring the thickness of a thermally applied coating as it is applied to a surface of a substrate, wherein thin ribbon is thermally applied from a spray gun, and overlapping ribbon portions form the coating as the spray gun progresses over the surface, said coating terminating in a step region on the surface, comprising:
obtaining, during relative movement of the substrate and spray gun, at least one surface profile of the applied coating along a geometric line segment on said surface intersecting said ribbon and extending across said step region; and
computing the thickness of the applied coating from said at least one obtained surface profile, wherein the surface profile is obtained by projecting a light beam along said line segment onto the surface of the substrate, and viewing the light beam at an oblique angle to the surface with a camera to record the profile of the projected light beam along said line segment.

2. A method as claimed in claim 1, wherein the spray gun moves across the substrate, said surface profiles of the substrate are obtained at different times, and the thickness of said applied coating is computed from the difference between successive said surface profiles obtained at different times.

3. A method as claimed in claim 1, wherein said thickness of said applied coating is computed in accordance with the equation h=A/d, where h is the thickness of the coating, A is the area under a curve representing the difference between the obtained surface profiles, and d is the distance moved by the spray gun between said times.

4. A method as claimed in claim 1, wherein said line segment intersects the applied thin ribbon at approximately a right angle.

5. A method as claimed in claim 1, wherein a series of images from the camera are recorded at a pre-established rate to obtain a series of profiles, and said profiles are added together and filtered to remove high frequency noise to obtain a first sub-pixel mathematical representation of the surface profile of the applied coating.

6. A method as claimed in claim 5, wherein a second mathematical representation of the surface profile of the applied coating is obtained by translating the first mathematical representation of the surface profile along said line segment to simulate the temporal offset of the camera used to obtain the first mathematical representation, a differential surface profile is obtained by subtracting the first and second mathematical representations, and the thickness of the coating is computed from said differential profile.

7. A method as claimed in claim 1, wherein the camera is stationary relative to the spray gun, and the spray gun and camera move together over the surface of the substrate.

8. A method as claimed in claim 1, wherein the surface profile is computed with the aid of an optical triangulation profilometer.

9. A method as claimed in claim 2, wherein the substrate is a rotating cylinder, and the spray gun moves in a direction parallel to the axis of the cylinder.

10. A method as claimed in claim 1, wherein the length of said line over which said surface profile is obtained is 3-4 times the extent of the spray from the spray gun.

11. A method as claimed in claim 1, wherein a plurality of parallel light beams is projected on said surface, and a plurality of surface profiles are obtained simultaneously.

12. A method as claimed in claim 1, wherein the spray gun makes multiple passes over the substrate, and a surface profile is obtained during each pass, the resulting thickness of applied coating is computed for that pass, and the total thickness of the substrate is computed by adding the thicknesses computed in each pass.

13. A method as claimed in claim 1, wherein the substrate is curved.

* * * * *